United States Patent [19]

Fickelscher

[11] Patent Number: 4,667,539
[45] Date of Patent: May 26, 1987

[54] PLANETARY GEAR DRIVE

[75] Inventor: Kurt G. Fickelscher, Frankenthal, Fed. Rep. of Germany

[73] Assignee: Balcke- Dürr AG, Ratingen, Fed. Rep. of Germany

[21] Appl. No.: 658,369

[22] Filed: Oct. 5, 1984

[30] Foreign Application Priority Data

Oct. 8, 1983 [DE] Fed. Rep. of Germany ....... 3336661

[51] Int. Cl.⁴ .............................................. F16H 1/28
[52] U.S. Cl. ........................................ 74/804; 74/640
[58] Field of Search ................. 74/804, 805, 640, 457, 74/460, 461, 462

[56] References Cited

U.S. PATENT DOCUMENTS

| | | | |
|---|---|---|---|
| 2,666,345 | 1/1954 | Amberg | 74/804 |
| 2,983,162 | 5/1961 | Musser | 74/804 |
| 3,043,164 | 7/1962 | Sundt | 74/804 |
| 3,572,151 | 3/1971 | Morozumi et al. | 74/462 |
| 3,667,320 | 6/1972 | Robinson | 74/640 |
| 3,789,700 | 2/1974 | Cotreau et al. | 74/640 X |
| 4,099,427 | 7/1978 | Fickelscher | 74/804 |
| 4,155,276 | 5/1979 | Fengler | 74/805 X |

FOREIGN PATENT DOCUMENTS

0047920 3/1983 European Pat. Off. .
2559577 5/1977 Fed. Rep. of Germany .
2617951 10/1977 Fed. Rep. of Germany .
3034133 3/1982 Fed. Rep. of Germany .

*Primary Examiner*—Allan D. Herrmann
*Assistant Examiner*—David Novais
*Attorney, Agent, or Firm*—Schwartz, Jeffery, Schwaab, Mack, Blumenthal & Evans

[57] ABSTRACT

A planetary gear drive comprising two adjacent central gears with different numbers of substantially wedge-shaped teeth which form virtual tooth gaps with one another and define a virtual crown curve and a planetary gear having teeth which are pressed into said virtual tooth gaps by a rotating element. With a difference of four in the numbers of teeth of the central gears, the center of curvature of the virtual crown curve and the radii of the root circles are such that in a predetermined engagement region the entry and exit angles and the radial speed of the teeth of the planetary gear remain substantially constant, and the flank angles of the central gears differ by at least about twice the entry angle. With a difference of two in the numbers of teeth of the central gears, the virtual crown curve largely extends out of the teeth after a 90° rotation, and the engagement region lies in the region of the minimum change of the entry and exit angles. Such gear drives have a low construction cost and can achieve transmission ratios as low as 1:6 while transmitting large rotational moments and avoiding rolling movement of the tooth flanks in the engagement region.

18 Claims, 16 Drawing Figures

$\alpha 7 = 73°$
$\alpha 2 = 68°$

PLANETARY GEAR DRIVE

BACKGROUND OF THE INVENTION

This invention relates to a planetary gear drive comprising two adjacent central gears with different numbers of wedge-shaped teeth which together form virtual tooth gaps and devine a virtual crown curve. A virtual crown curve is a closed curve upon which the points of the virtual tooth gaps lie. The invention further comprises a planetary gear whose teeth are pressed into the virtual tooth gaps by a rotating element.

A planetary gear drive with two internally toothed central gears with different numbers of teeth is described in U.S. Pat. No. 4,099,427. The teeth of a planetary gear are pressed into the virtual tooth gaps during rotation of a rotating element. A fit or adaptation to the change of the virtual tooth gaps is achieved by pivotable and elastic positioning of the teeth of the planetary gear. Such planetary gear drives have found application primarily in actuating drives. It has become apparent that the known planetary gearings are capable of only limited application at high rotational speeds and small transmission ratios in the range of about 1:30 down to 1:6. The changes in the angle of opening of the virtual tooth gaps and in the entry angle are so large in such cases that conventional fitting by means of an elastic toothed band, elastic frame or pivotable teeth is not adequate to avoid the rolling motion of the tooth flanks caused by the entering angle. Planetary gears of the aforementioned type, which are also called sliding key or sliding wedge gears, have been tested with rolling profiles in which up to 30% of the teeth are engaged. Because of the curvature of the tooth flanks, large Hertzian stresses result so that significantly lower rotational moments are transmittable than with flatter positioning of the tooth flanks. Furthermore, very narrow work tolerances must be maintained in producing the central gears and the planetary gears with special tooth flank profiles. This results in high production costs. Finally, the previously known elastic positioning and design of the planetary gear is not well suited for realizing small gear reductions.

SUMMARY OF THE INVENTION

It is therefore an object of the invention to provide improved planetary gears of the aforementioed type with low construction costs so that gear reductions to 1:6 can be achieved without adversely affecting the magnitude of the transmittable rotational moment.

It is a further object of the invention to substantially avoid rolling movements in the area of the tooth flanks and to maintain a high rotational exactitude through a constant radial speed, even at high rotational driving speeds.

Additionally it is an object of the invention to provide a planetary gear suited for use with transmission ratios smaller than 1:30.

Yet another object of the invention is to provide a planetary gear drive which avoids costly tooth shapes in production and provides a substantially flat engagement of the tooth flanks in order to avoid high Hertzian stresses.

A still further object of the invention is to provide a planetary gear suited for transmitting large rotational moments but which has a low weight and a small construction volume.

These and other objects of the invention are achieved by providing a planetary gear drive comprising two adjacently disposed coaxial central gears with differing numbers of substantially wedge-shaped gear teeth which form virtual tooth gaps with one another and define a virtual crown curve, the radii of the root circles of the two central gears being of different size, said planetary gear drive further comprising a planetary gear having teeth which are pressed by means of a rotating element into said virtual tooth gaps formed by the teeth of the central gears, the center of curvature of said virtual crown curve and the differing radii of the root circles of the two central gears being selected such that in a predetermined engagement region, the entry and exit angles and the speed of radial displacement of the teeth of the planetary gear remain substantially constant, and the flank angles or said central gears differing from each other by at least about twice the value of said entry angle.

In another aspect of the invention the objects are achieved by providing a planetary gear drive comprising two adjacently disposed coaxial central gears with differing numbers of substantially wedge-shaped gear teeth which forms virtual tooth gaps with one another and define a virtual crown curve, the radii of the root circles of the two central gears being of different size, said planetary gear drive further comprising a planetary gear having teeth which are pressed by means of a rotating element into said virtual tooth gaps formed by the teeth of the central gears, the center of curvature of said virtual crown curve and the differing radii of the root circles of the two central gears being selected such that the virtual crown curve extends largely out of the row of gear teeth of said central gears after a 90° rotation, and a predetermined engagement region between the teeth of the planetary gear and the virtual tooth gaps formed by the teeth of the central gears lying in the region of minimum change of the entry and exit angles.

According to the invention, for central gears with a difference in the number of teeth of four, the center of the virtual crown curve as well as the different radii of the central gears are chosen such that in the predetermined engagement region the entry and/or exit angles and/or the radial displacement speed of the teeth of the planetary gear are substantially constant, and the flank angles of the central gears differ by at least about the double the value of the entry angle. If the difference in the number of teeth is two, the virtual crown curve runs largely out of the virtual tooth row in the case of a 90° rotation, and the engagement region lies in the region of minimum change of the entry and/or exit angles. The entry or exit angle $\beta$ is defined by two intersecting rays, one of which proceeds from the common center of the two central gears to the root or bottom of a virtual tooth gap and the other of which proceeds from the center of curvature of the virtual crown curve to the root of the same virtual tooth gap.

With a comparatively low construction costs, the rolling movement can be largely avoided, and from separation to separation a substantially constant radial displacement of the teeth of the planetary gear can result, so that a practically undisturbed harmonic rotational movement can be achieved. It is significant that central gears with specially designed teeth, or teeth which can only be produced at a high cost are avoided, and a flat engagement of the tooth flanks is assured. The planetary gear can not only be used in actuating drives, as already mentioned, it can be used to explore new applications requiring higher rotational speeds. The planetary gear also has a surprisingly simple construction, particularly with transmission ratios or gear reductions smaller than 1:30. Thus, as a result of suitable selection of the diameters of the central gears and the thereby resulting crown curve displacement, the specific requirements of a given situation can be met at an extremely low cost. By means of the crown curve displacement according to the invention, the progression of the virtual crown curve can be predetermined in such a manner that requirements of operation and of construction can be met in an optimal fashion. The invention results in an adaptation to the change in the virtual separation, i.e., the change in the effective pitch between the bottoms of the virtual tooth gaps, and according to the invention, the relationship of radial displacement to the separation remains substantailly constant. The planetary gearing according to the invention with a difference in number of teeth equal to four is particularly suited for high rorational speeds. Gear reductions as low as 1:6 may be achieved with corresponding degrees of freedom of the teeth or sliding wedges. Highly specific rotational moments are transmitted with surprisingly quiet running in the reduction range between 1:120 and 1:6. The preferred application range of the gearing with a difference of two in the number of teeth lies between 1:300 and 1:40 according to the invention, whereby very high rotational moments may be transmitted at medium rotational speeds. Compared with a gearing with a difference of four in the number of teeth, a gearing with a difference of two has for equal conversion or reduction, on the one hand, half the number of teeth and, on the other hand, doubly large teeth and double the eccentricity. Both constructions can, within the scope of the invention, be built completely free of play and may be prestressed. Finally, the comparatively small tooth speed, as well as the lack of noise and vibration is of substantial practical value.

In one particular embodiment, the flank angles of the teeth of the second central gear with the smaller number of teeth are greater than the flank angles of the teeth of the first central gear by twice the value of the entry angle, and the flank angles of the teeth of the planetary gear have an intermediate value or a value approaching the flank angles of the second central gear. Furthermore, the tooth flanks of the planetary gear teeth from the root of the tooth and/or to the crown are rounded off by a small angle or provided with a comparatively large radius of curvature. The flat surface engagement of the tooth flanks is achieved by these measures in a particularly simple fashion, even with small tranmission ratios ranging to 1:6. The surface pressure or stress can be kept low, and correspondingly larger rotational moments can be transmitted within a small constructional volume. It is further ensured that, in individual sections of the radial displacement, the respective flank angles of the engaged portions of the planetary gear teeth are close to identical to the virtual gap angles defined by the engaged portions of the central gear teeth. The teeth of the planetary gear, designed according to the invention, ensure at a low construction cost a fit or adaptation to the changing virtual gap flank angle, whereby, in order to achieve uniform displacement of the teeth, a tangential correction of the rotating element for the planetary gear is also effected according to the invention. Because of the tangential correction of the rotating element, the teeth of the planetary gear are pressed into the virtual tooth gaps in such a fashion that a flat engagement is effected without play. This is of substantial significance above all with a planetary gear whose tooth flanks have a curved design. Compared with planar tooth flanks, curved tooth flanks have a correspondingly smaller spacing in the area in contact, and the tooth must be pressed correspondingly further into the virtual tooth gaps. The effective tooth height is correspondingly larger in the engagement region, and, by means of the tangential correction, the rotating element according to the invention has a correspondingly enlarged diameter. It is further expressly noted that, because of the substantially constant entry and exit angles between the engaging teeth, practically no rolling movement results. As a result of the angular correction, it is assured that practically all of the teeth of the planetary gear have a substantially equal surface contact with the tooth flanks of the central gears which are engaged, and consequently, an outstanding load distribution is achieved. In contrast to known gears with otherwise equal dimensions, the planetary gear according to the invention can transmit substantially higher rotational moments.

In one advantageous embodiment in which the difference in the number of teeth is four, the center of curvature or focus of the virtual crown curve for the engagement region within one quadrant lies in the neighoring quadrant. Said center or focus is displaced from the center of the central gears in the x- and y-directions a distance which is at least about half as large as the height H of the virtual crown curve in the engagement region. Consequently, the crown curve is flattened in the transition zone between the two quadrants. In this particularly simple and inexpensively achievable manner, it is assured that a substantially constant radial displacement from separation to separation will occur. These arrangements apply to the engagement regions of the entering and of the exiting teeth of the planetary gear. The entering curve is generated by quarter circles which are pressed together by double the value of the aforesaid spacing in the x-direction and pushed apart in the y-direction by double the value of the spacing.

In an alternative embodiment having a difference of two in the number of teeth, the center of curvature or focus of the crown curve for an engagement region within one quadrant lies on the center line between that quadrant and the neighboring quadrant. In this case, the center or focus of the crown curve is spaced from the center of the coaxial central gears by a distance in the y-direction which is about as great as the height H of the crown curve in the engagement region. The crown curve is therefore flattened in the region of said center line. Said height is substantially as large as the height of the teeth of the central gear with the smaller diameter. It is worth noting that with a difference in the number of teeth of two, the same transmission ratio is achievable with half the number of teeth on the central gears as with a difference in the number of teeth of four. Furthermore, compared with a difference in the number of teeth of four, a gear drive with a difference in the number of teeth of two has doubly large teeth and twice the eccentricity with the same flank angle. These factors make a planetary gearing with a difference of two in the number teeth on the central gears particularly suited for larger transmission ratios, especially with the use of plastic teeth or with easily manufactured resilient toothed bands. The associated rotating element has a quasi-elliptical form. Because of the crown curve displacement according to the invention, the change of the entry and exit angles is significantly smaller; the angular change always occurring in the same direction. In addition, the curve for angular change has no point of inflection in the engagement region. Finally, it is noted that the change of the entering angle becomes smaller as the transmission ratio increases, and the curvature of a curve representing the angular change also decreases with increasing transmission ratio.

In another embodiment, the tooth flanks of the teeth of the planetary gear are beveled or rounded off at the tooth root and/or at the tooth crown by a small angle or by a large radius of curvature. The wedged-shaped teeth of the planetary gear thus have tooth flanks which are not completely planar, rather they are rounded off in the indicated manner. A flat surface engagement of the teeth of the central gear is thus assured in an especially simple fashion. It is expressly noted that the tooth flank design is not costly to produce, rather the rounding off is economically produced without special gear cutting machines. The flank shape of the teeth of the planetary gear is thus adapted or fit to the changing flank angle $\alpha$ v in the particular sections of the radial displacement. In the individual sections, the flank angle equals the virtual gap angle. The resulting stepped angular change from section to section is smoothed by a curve with an appropriately large radius In connection with the tangential correction according to the invention, there results a fit or adaptation to the change of the effective tooth height of the teeth of the planetary gear. The flattening at the crowns of the tooth correspond to an insignificant decrease in the distance between the tooth flanks compared with planar tooth flanks. The tooth must therefore be pushed correspondingly further outward from the rotating element. This is achieved by the tangential correction.

In a particular embodiment, the planetary gear includes a support ring for teeth in the form of sliding keys or wedges, and a shaft is connected with the support ring by means of mounting elements for each tooth. The individual sliding keys are at least partially hollow in the inside and encompass the shaft in each case through an angle greater than 180°. A functional positioning of the sliding keys of the planetary gear is thus achieved with a simple construction and small weight and space requirements. The sliding keys are pivotable to a certain degree about the respective shafts in order to effect a fit to the changing virtual tooth gaps under all operating conditions. The shafts are advantageously made hollow to reduce their weight, whereby pins on the mounting elements are appropriately press fitted in the axial ends of each shaft. Furthermore, the mounting elements have radially inwardly disposed hooks or catches which encompass the front or inward side of the support ring. The sliding keys are thus movably arranged on the support ring at a low construction cost, so that they may also adjust themselves with respect to the separation change, and simple production is also assured.

In a further embodiment, the teeth of the planetary gear lie with their points against a retaining ring which surrounds the planetary gear. This retaining ring is appropriately positioned between the two central gears, each of which has a corresponding annular recess. The retaining ring has a comparatively small wall thickness and is elastic. The individual teeth of the planetary gear are thereby firmly held by the mounting ring, and an arrangement free of play is effected.

Further objects, features and advantages of the present invention will become apparent from the following detailed description of preferred embodiments when considered together with the attached figures of drawing.

DETAILED DESCRIPTION OF PREFERRED EMBODIMENTS

Figure 1:
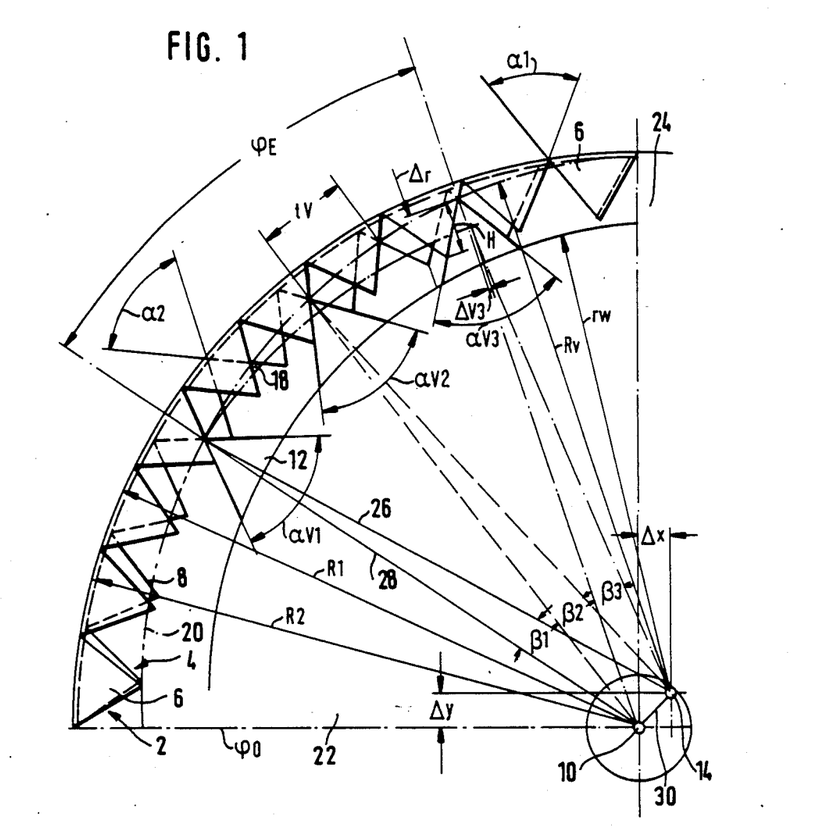
FIG. 1 shows an axial view of one quadrant of an embodiment with a difference in the number of teeth equal to four.

FIG. 1 shows a schematic axial view of a portion of the planetary gearing with two internally toothed central gears 2, 4 on which only teeth 6 and 8 are represented for reasons of clarity. The central gear 2, foremost in the direction of view, has a root radius $R_1$, and the second central gear 4, which lies behind the first, has a smaller root radius $R_2$. Both gears have a common center 10. The front central gear 2 has a total of forty teeth 6 about its entire circumference, and the back central gear 4 has thirty-six teeth 8 altogether. The difference in the number of teeth $\Delta Z$ therefore amounts to four, and furthermore, the transmission ratio in this preferred embodiment is 1:10. The ratio of the tooth height or maximum crown curve height H to the radius $R_1$ has a value of 0.12. Only three teeth 12 of the planetary gear are shown for reasons of clarity. The teeth move on a curve with radius $R_w$ about the center or focus 14 of a crown curve 16, and are pressed into the virtual tooth gaps 18 in the engagement region. The virtual tooth gap angles for the three teeth 12 of the planetary gear are given as $\alpha$ V1, $\alpha$ V2, and $\alpha$ V3. The front central gear 2 has a tooth gap angle $\alpha 1$, and the back central gear 4 has a tooth gap angle $\alpha 2$.

Both internally tooth central gears 2 and 4, which are in form of ring gears, are rotatable about a common point of rotation, the coaxial center 10. Of course, central gears 2 and 4 are correspondingly formed in the other, not represented, quadrants. A displacement of the crown circle curve 20 results because of the given difference in the root circle radii $R_1$ and $R_2$. The crown curve extends out of the teeth at a location identified by line $\phi 0$ and substantially coincides with the root radius $R_2$ at an angle 90°, i.e., at the top of the drawing. The center or focus 14 of the crown curve 20 for the engagement region of the illustrated quadrant 22 lies, according to the invention, in the neighboring quadrant 24. The distances between said crown curve center 14 and the common center 10 in the x- and y- directions are $\Delta y$ and $\Delta x$, respectively. The distance in each case is substantially equal to half the tooth height or maximum height H of the crown curve in the engagement region. The three teeth 12 shown in the engagement region, which are formed as sliding keys, are displaced along their radial vectors 26 during movement of the rotating element. The radial vectors extend from the center 14, and intersect the crown curve 20 in the manner shown. The radial vectors 26 in each case form an entry angle $\beta 1$, $\beta 2$ and $\beta 3$ together with a line 28 which also intersects the crown curve but extends from the center point 10. Lines 26 and 28, along with connecting line 30 extending between center 10 and center 14, form substantially similar triangles which enclose the entry angles, $\beta 1$, $\beta 2$, $\beta 3$. Because the connecting line 30, the radial vectors 26, and the diameter Rv of the crown curve 20 remain constant, only an insignificant change occurs in the entry angle corresponding to the difference $R_1$ minus $\Delta r$. In the present embodiment it has been found surprisingly that in the given engagement region the entry angle $\beta 1$, $\beta 2$, $\beta 3$ exhibits a merely insignificant change in the range between 5° and 5.2°.

A substantially constant radial displacement of the sliding keys or teeth 12 of the planetary gear is therefore achieved from one segment or separation tv to the next separation. It is of substantial significance that the separation tv in each case also continuously changes by the same value $\Delta$ tv, as long as the aforesaid entry angles are substantially equal. The gearing is therefore particularly suited for high drive ratio values because of the kinematic characteristics achieved in this fashion. Furthermore, it is of substantial importance that even very small transmission ratios ranging to as low as 1:6 can be realized without difficulty using only two central gears. It is to be noted that the engagement region is nearly independent of the transmission ratio. The entry curve or cam configuration is defined by quarter circles which, when viewed over the circumference, are twice pressed together by $\Delta x$ and twice pushed apart by $\Delta y$, respectively. It is particularly noted that the continuous circular curvature is exceptionally well suited for planetary gear drives with slide bearings. The flank angles of the teeth are predetermined with particular regard for the eccentricity and the efficiency. The smaller tha flank angle is chosen, the greater the efficiency and also the eccentricity are. In the illustrated preferred embodiment, the flank angle has a value of 60°, and, with regard to the above-mentioned entry angle $\beta$ of about 5°, there results a flank angle of the sliding key or tooth 12 of the planetary gear of about 70°. Because no rolling movement between the teeth takes place in view of the substantially constant entry angle, the flank angle of the second central gear 4 is also set at 70°. Finally, the flank angles of the teeth 12 are slightly rounded off acording to the invention in accordance with the angular change in the engagement region. In the illustrated embodiment which has a total of thirty-eight sliding keys or teeth, twelve entering and twelve exiting members are substantially flatly engaged with the associated central gear teeth. It is particularly important that six sliding keys are engaged in each quadrant, and a surprisingly even load distribution is achieved so that the gearing according to the invention can transmit substantially higher rotational moments than heretofore possible.

Figure 2:
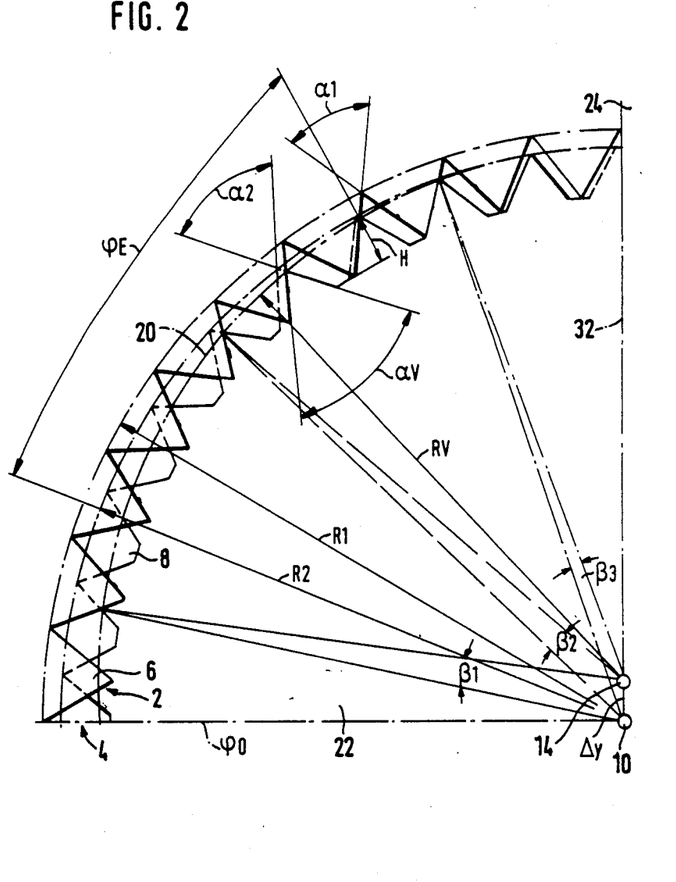
FIG. 2 is a schematic radial section similar to FIG. 1, however, for a difference in the number of teeth equal to two.

FIG. 2 shows an embodiment of the planetary gear drive with a difference in the number of teeth Z equal to two. The front central gear 2 has forty teeth 6, whereas the rear central gear 4 has total of thirty-eight teeth 8. According to the drawing, at the angle $\phi 0$ the virtual crown curve extends practically out of the row of teeth. The center 14 of the crown curve 20 is located on the center line 32 which separates the quadrant 22 from its neighboring quadrant 24. The center 10 and the center 14 are spaced from each other in the direction of the y-axis by a distance $\Delta y$ which is about half as great as the tooth height or maximum crown curve height H. The rotating element associated with the planetary gear has a quasi-elliptical form. As a result of the aforementioned crown curve displacement, a substantial decrease in the change of the entering angle takes place. The preferred engagement region at a transmission ratio of about 1:20 lies preferably between 55 and 80 angular degrees and, at a transmission ratio of about 1:60, between 40 and 80 angular degrees. In these ranges, the cam curve can be replaced by straight lines, and a nearly uniform radial displacement is achieved. It is noted that the engagement region decreases in size as the transmission ratio decreases.

Figure 3:
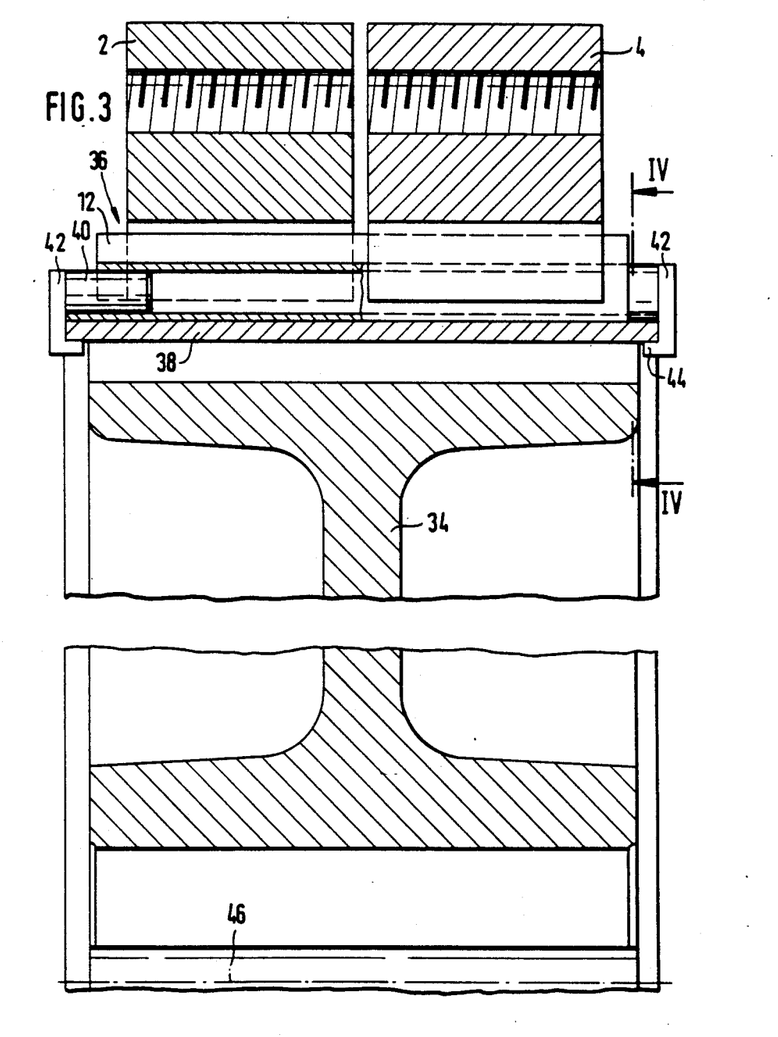
FIG. 3 shows an axial section through a working embodiment.

FIG. 3 shows an embodiment in which the rotating element 34 is seen. The planetary gear 36 comprises a support ring 38 on which each of the teeth 12 is pivotably positioned about a shaft 40. The shaft 40 is connected at both of its axial face surfaces with the support ring 38 by means of mounting elements 42. The mounting elements 42 have a radially inwardly disposed projection or catch 44 which encompasses the support ring as shown in the drawing. The central gears 2 and 4 lie close together in the direction of the axis of rotation 46. The above-described common center of the two central gears lies on axis of rotation 46.

Figure 4:
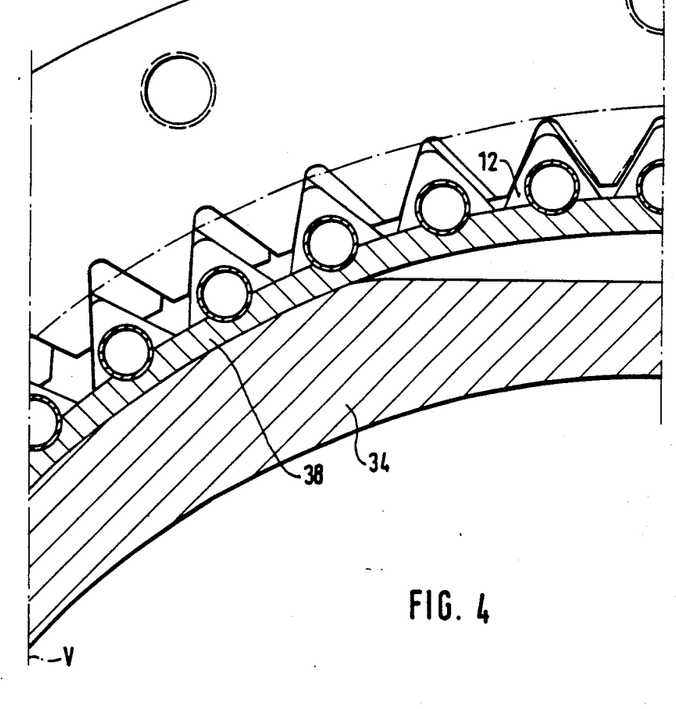
FIGS. 4 and 5 together show a radial section along the section line IV—IV in to FIG. 3.
Figure 5:
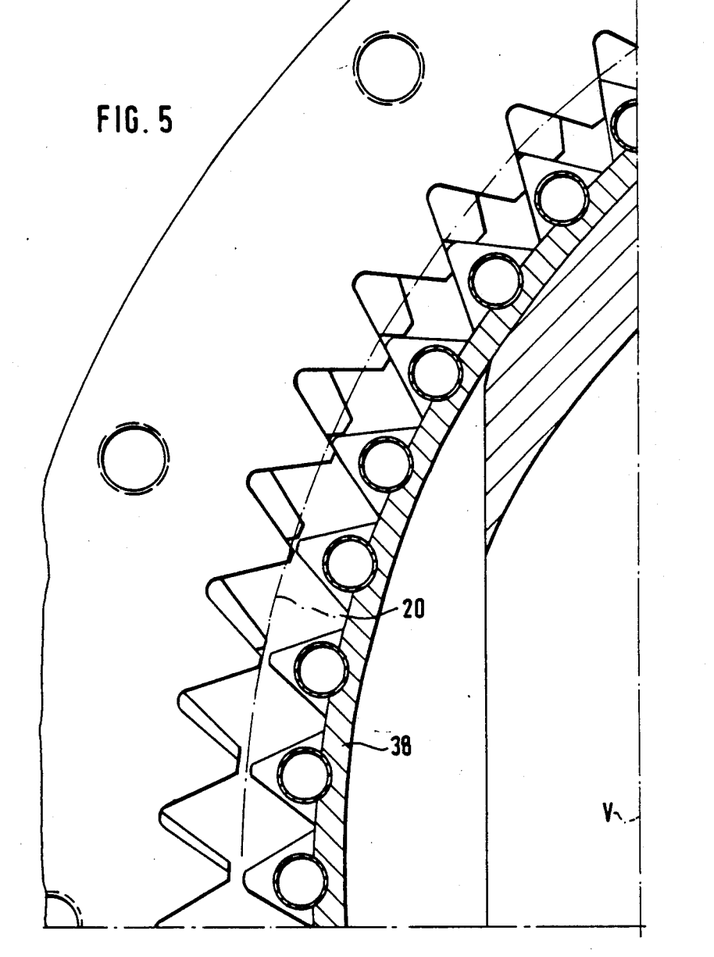

FIGS. 4 and 5 show a radial section of a planetary gear drive according to FIG. 3 along section line IV—IV. The section line is the same for both figures, i.e., FIG. 5 is appropriately connected to the left side of FIG. 4. The support ring 38 lies against the rotating element 34 throughout a predetermined angular range which substantially defines the engagement region.

Figure 6:
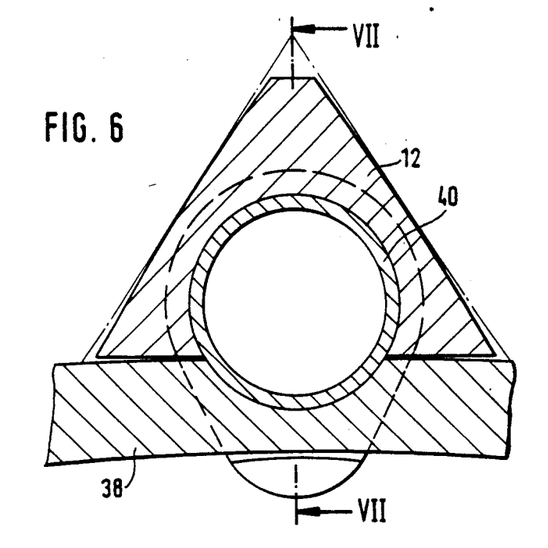
FIG. 6 shows an enlarged section through a planetary gear tooth in the form of a sliding key.
Figure 7:
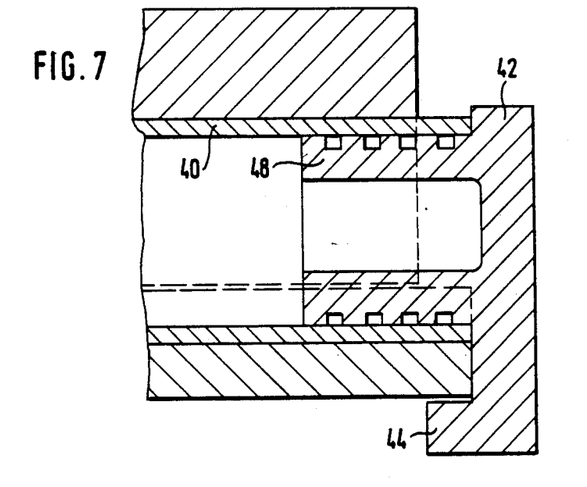
FIG. 7 shows a section along the section line VII—VII in FIG. 6.

FIG. 6 shows an enlarged view of a tooth 12 which is arranged and fastened on the support ring 38 so as to be pivotable to a certain degree about the hollow cylindrical shaft 40. In conjunction with FIG. 7, it can be seen that the mounting element 42 engages the hollow shaft 40 with a pin 48, while the catch 44 encompasses the radially inward surface of the support ring 38 with a predetermined amount of play. The pin 48 is fastened in the hollow shaft 40 by a press fit or similar suitable means. The tooth flanks are rounded off in the region of the tooth root and also the tooth crown, by means of which, according to the invention, a flat surface engagement with the teeth of the central gears is achieved.

Figure 8:
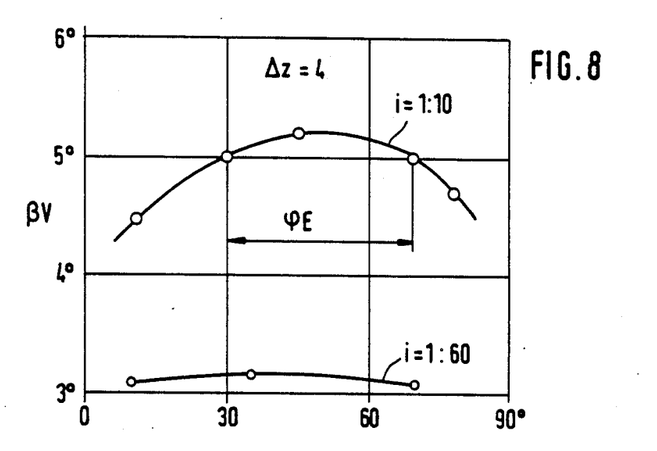
FIG. 8 is a graph showing the change of the entry angle $\beta$ with a difference in the number of teeth equal to four.

FIG. 8 shows the change of the entry angle $\beta$ for gear reduction ratios of 1:10 and 1:60. In the first case, in the desired engagement region $\phi$ E, the angle $\beta$ changes only insignificantly from 5° to 5.2°. This assures that, according to the invention, a substantially constant radial displacement is achieved from separation to separation.

Figure 9:
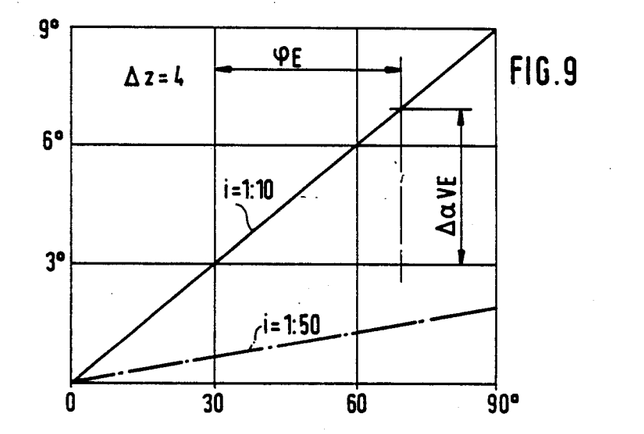
FIG. 9 is a graph showing the change of the flank angle $\Delta \alpha$.

The change of the flank angle $\alpha$ v of the virtual tooth gaps can be seen from FIG. 9. This change amounts to about 4° in the predetermined engagement region. It is noted that the engagement region is determined by flattening the outer surface of the rotating element of the planetary gear so that the teeth are uncoupled outside the engagement region. Because of the flattened out regions, the teeth can change direction without disturbing the rotational movement.

Figure 10:
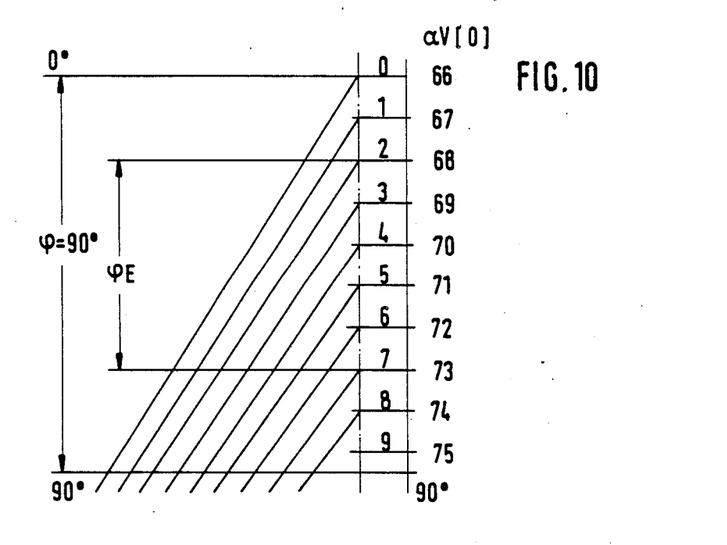
FIG. 10 is a graph showing the change of the gap angle $\alpha$ v of the virtual tooth gaps.

As seen in FIG. 10, for a transmission ratio of i=1:10, for example, the flank angle $\alpha$ v of the virtual tooth gaps changes in the angular range of 0° to 90° in one quadrant. In one advantageous embodiment, the flank shape of the massive sliding keys or teeth of the planetary gear is adapted or fit to the changing flank angle $\alpha$ v in individual sections of the radial displacement. According to the invention, the flank angle in the individual sections is equal to the gap angle.

Figure 11:
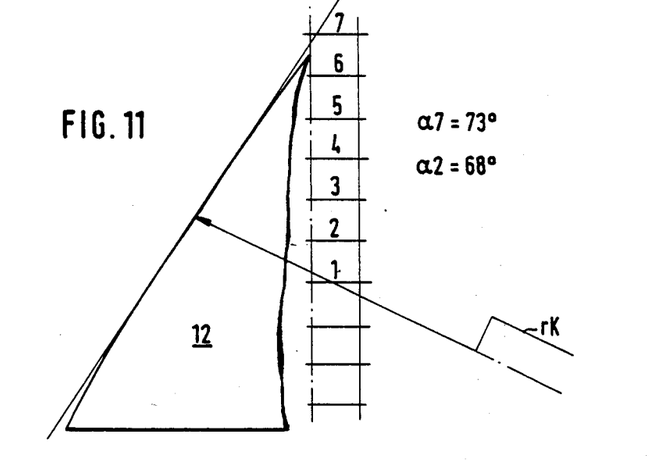
FIG. 11 is a partial view of a tooth of the planetary gear with the corresponding stepped angular change fitted to it.

FIG. 11 shows in a schematic axial view a sliding key fit to the stepped angular change in this manner; the steps being smoothed out by a curve with a very large radius rk. A quasi-planar engagement is achieved with each displacement step. A tangential correction of the driving shaft is undertaken according to the invention to achieve a uniform displacement of the sliding keys, insofar as the effective tooth height changes slightly depending on the different sliding key angles.

Figure 12:
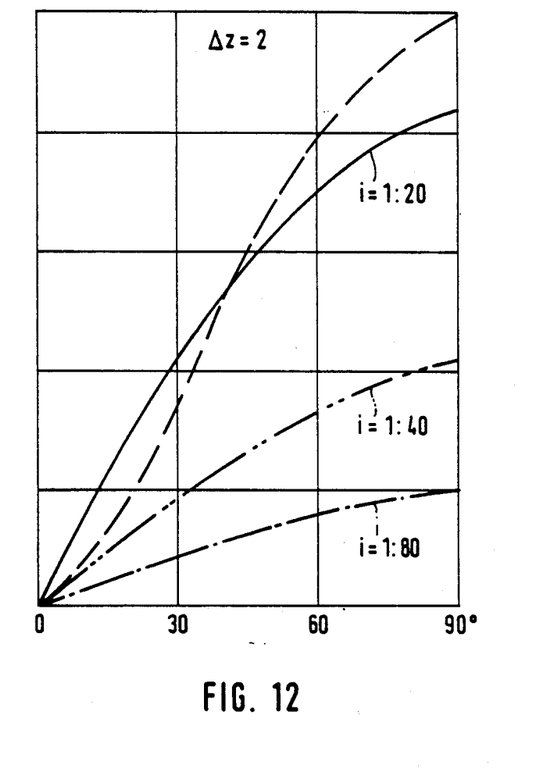
FIG. 12 is a graph showing the change of the entry angle $\beta$ where the difference in the number of teeth equals two.

FIG. 12 shows the change of the entry angle $\beta$ for different transmission ratios with a difference of two in the number of teeth. The dashed curve applies without the prescribed crown curve displacement. According to the invention, the angular change is smaller and there is no inflection point. Furthermore, the angular change and the curvature of the curve become smaller at larger transmission ratios.

Figure 13:
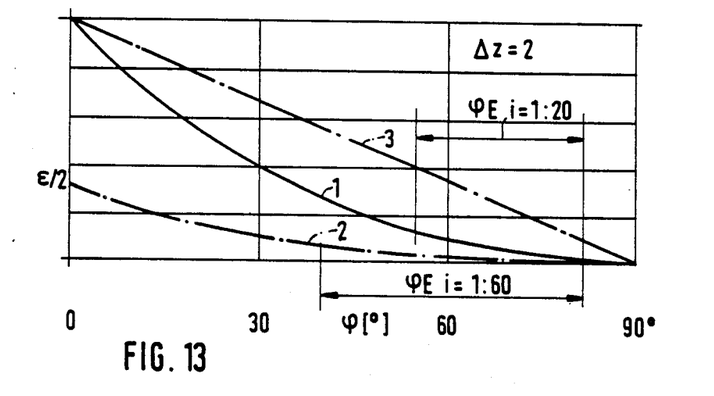
FIG. 13 is a graph showing a quarter evolute of the embodiment according to FIG. 2.

In FIG. 13, the quarter evolutes are shown with expanded abscissas for a difference in the number of teeth $\Delta$ Z equal to two. The rotating element has a quasi-elliptical form generated by rotation of the evolute. The preferred engagement region $\phi$ E, according to the invention, lies between 55° and 80° for the transmission ratio i=1:20 and between 40° and 80° for the transmission ratio i=1:60. In these regions, the curves are nearly linear, and the radial displacement is substantially uniform.

Figure 14:
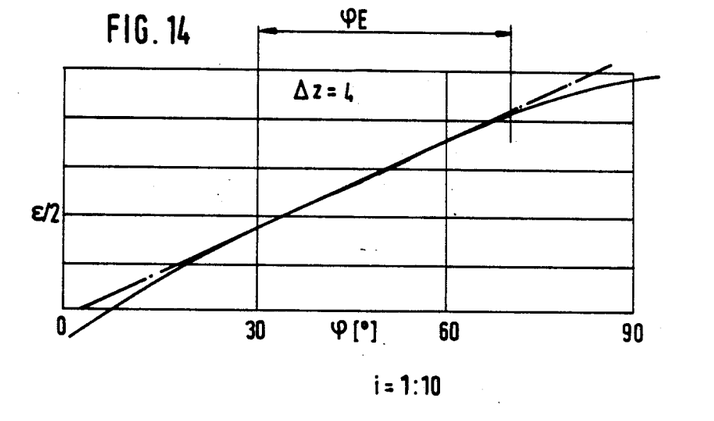
FIG. 14 is a graph showing the course of the radial displacement with a difference in the number of teeth equal to four in accordance with FIG. 1.

In FIG. 14, the course of the radial displacement is shown for $\Delta$ Z equal to four and the transmission ratio i=1:10. The predetermined engagement region $\phi$ E for this particular embodiment lies between 30° and 70°. In this case also, the linear curve corresponds to a constant tooth speed.

Figure 15:
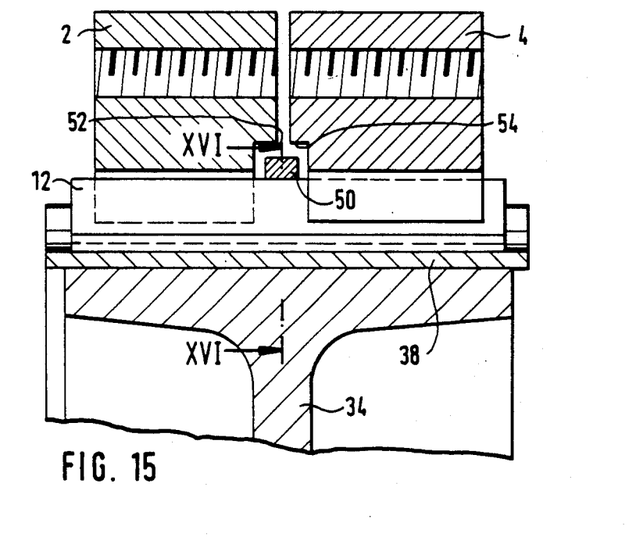
FIG. 15 shows an axial section, similar to FIG. 3, in which the teeth of the planetary gear are surrounded by a retaining ring.

FIG. 15 shows an axial section similar to FIG. 3 in which the teeth 12 of the planetary gear are encircled by a retaining ring 50. The retaining ring 50 is located betwen the central gears 2 and 4 which each have an annular recess 52 and 54. By means or retaining ring 50, which is elastic due to its comparatively small radial height, the individual teeth or sliding keys are securely mounted on and pressed against the support ring 38. This ensures that the teeth 12 are reliably attached without play.

Figure 16:
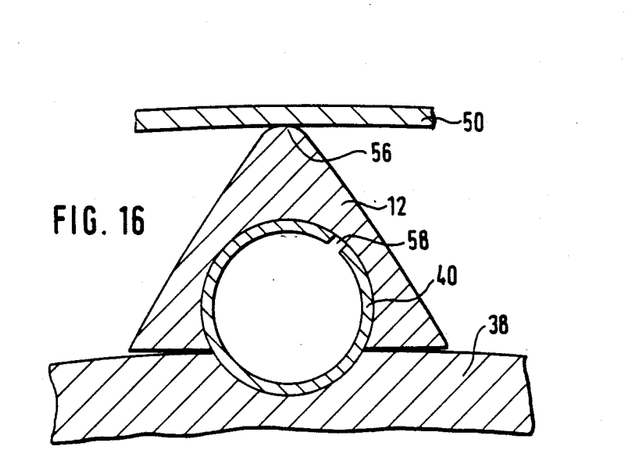
FIG. 16 shows an enlarged section along section line XVI—XVI in FIG. 15.

FIG. 16 shows a section taken along the section line XVI—XVI of FIG. 15, in which the central gears and the rotating element are not shown. The point 56 of the tooth 12 is rounded off to avoid a high surface pressure. The hollow shaft 40 has a slit 58 running along its length. The elastic positioning and supporting of the teeth 12 of the planetary gear facilitates a shock absorbing enagement of the individual teeth 12 in the radial direction. In conjunction with the retaining ring 50, this arrangement assures an elastic shock absorbing mounting of the teeth on the one hand, and an engagement of the teeth in the virtual tooth gaps without play on the other hand.

The foregoing description has been set forth merely to illustrate the invention, and it is not intended that the invention be limited just to the described embodiments. Since modifications of the described embodiments incorporating the spirit and substance of the invention may occur to persons skilled in the art, the scope of the invention is to be limited solely with respect to the appended claims and equivalents.

I claim:

1. A planetary gear drive comprising two adjacently disposed coaxial central gears with differing numbers of substantially wedge-shaped gear teeth which form virtual tooth gaps with one another and define a virtual crown curve, the radii of the root circles of the central gears being of different size, said gear drive further comprising a planetary gear having teeth which are pressed by means of a rotating element into said virtual tooth gaps, the center of curvature of said virtual crown curve and the differing radii of the root circles of the two central gears being selected such that in a predetermined engagement region, the entry and exit angles and the speed of radial displacement of the teeth of the planetary gear remain substantially constant, and flank angles of said central gears differing from each other by at least about twice the value of said entry angle.

2. A planetary gear drive according to claim 1, wherein the difference between the numbers of teeth on the two central gears is equal to four.

3. A planetary gear drive according to claim 1, wherein the center of curvature of the virtual crown curve within one quadrant of the gear drive lies in an adjoining quadrant and said center of curvature is spaced from the common center of the two central gears in x and y coordinate directions of a distance which is at least about half as large as the height of the virtual crown curve in said predetermined engagement region, said virtual crown curve being flattened in a transition zone between said one quadrant and said adjoining quadrant.

4. A planetary gear drive according to claim 1, wherein the teeth of the planetary gear are formed as sliding keys having a flank configuration such that the flank angle is substantially equal to the effective flank angle of engaged portions of the associated virtual tooth gap for all radial displacements of the engaged slide key.

5. A planetary gear drive according to claim 1, wherein the flank angle of the gear teeth of the central gear having the smaller number of teeth is greater than the flank angle of the gear teeth of the central gear having the greater number of teeth by an amount equal to twice the entry angle, and wherein the teeth of the planetary gear have a flank angle lying in the range between the flank angles of the two central gears.

6. A planetary gear drive according to claim 1, wherein the tooth flanks of the teeth of the planetary gear are slightly cut away at at least one of the tooth crown and the tooth root.

7. A planetary gear drive according to claim 1, wherein the tooth flanks of the teeth of the central gears are slightly rounded off at least one of the tooth crown and the tooth root.

8. A planetary gear drive comprising two adjacently disposed coaxial central gears wtih differing numbers of substantially wedge-shaped gear teeth which form virtual tooth gaps with one another and define a virtual crown curve, the radii of the root circles of the two central gears being of different size, said gear drive further comprising a planetary gear having teeth which are pressed by means of a rotating element into said virtual tooth gaps, wherein the center of curvature of said virtual crown curve and the differing radii of the root circles of the two central gears are selected such that the virtual crown curve extends largely out of the row of gear teeth of said central gears after a 90° rotation, wherein a predetermined engagement region between the teeth of the planetary gear and the virtual tooth gaps formed by the teeth of the central gears lies in a region of minimum change of the entry and exit angles, wherein the difference between the numbers of teeth on the two central gears is equal to two, wherein the center of curvature of the virtual crown curve for said predetermined engagement region within one quadrant of the gear drive lies on the center line between that quadrant and an adjoining quadrant, said center of curvature and the common center of said planetary gears being spaced from each other in the y coordinate direction a distance at least about as large as the height of the virtual crown curve in said engagement region, and wherein said virtual crown curve is flattened in the region of said center line.

9. A planetary gear drive according to claim 8, wherein the teeth of the planetary gear are formed as sliding keys having a flank configuration such that the flank angle is substantially equal to the effective flank angle of engaged portions of the associated virtual tooth gap for all radial displacements of the engaged slide key.

10. A planetary gear drive according to claim 8, wherein the tooth flanks of the teeth of the planetary gear are slightly cut away at at least one of the tooth crown and the tooth root.

11. A planetary gear drive according to claim 8, wherein the tooth flanks of the teeth of the central gears are slightly rounded off at at least one of the tooth crown and the tooth root.

12. A planetary gear drive comprising two adjacently disposed coaxial central gears with differing numbers of substantially wedge-shaped gear teeth which form virtual tooth gaps with one another and define a virtual crown curve, the radii of the root circles of the central gears being of different size, said gear drive further comprising a planetary gear having teeth which are pressed by means of a rotating element into said virtual tooth gaps, the center of curvature of said virtual crown curve and the differing radii of the root circles of the two central gears being selected such that in a predetermined engagement region, the entry and exit angles and the speed of radial displacement of the teeth of the planetary gear remain substantially constant, and flank angles of said central gears differing from each other by at least about twice the value of said entry angle, wherein said planetary gear comprises a support ring for the individual planetary gear teeth, each of said teeth being in the form of a sliding wedge disposed on a shaft such that the tooth surrounds the shaft through an angle greater than 180°, the shaft of each tooth being connected to said support ring by means of at least one mounting member.

13. A planetary gear drive according to claim 12, wherein each of said shafts is in the form of a hollow cylinder and two mounting members are provided each comprising a pin grippingly inserted in one of the axial ends of said hollow shaft and a projecting catch which extends around said support ring.

14. A planetary gear drive according to claim 12, wherein said shafts of said planetary gear teeth are hollow and are provided with a longitudinal slit along the entire length thereof whereby said shafts resiliently support said planetary gear teeth.

15. A planetary gear drive comprising two adjacently disposed coaxial central gears with differing numbers of substantially wedge-shaped gear teeth which form virtual tooth gaps with one another and define a virtual crown curve, the radii of the root circles of the central gears being of different size, said gear drive further comprising a planetary gear having teeth which are pressed by means of a rotating element into said virtual tooth gaps, the center of curvature of said virtual crown curve and the differing radii of the root circles of the two central gears being selected such that in a predetermined engagement region, the entry and exit angles and the speed of radial displacement of the teeth of the planetary gear remain substantially constant, and flank angles of said central gears differing from each other by at least about twice the value of said entry angle, wherein said planetary gear comprises a support ring, and the teeth of said planetary gear are held against said support ring by an elastic retaining ring disposed annularly around said teeth.

16. A planetary gear drive according to claim 15, wherein the points of the planetary gear teeth are rounded off.

17. A planetary gear drive comprising two adjacently disposed coaxial central gears with differing numbers of substantially wedge-shaped gear teeth which form virtual tooth gaps with one another and define a virtual crown curve, the radii of the root circles of the central gears being of different size, said gear drive further comprising a planetary gear having teeth which are pressed by means of a rotating element into said virtual tooth gaps, the center of curvature of said virtual crown curve and the differing radii of the root circles of the two central gears being selected such that in a predetermined engagement region, the entry and exit angles and the speed of radial displacement of the teeth of the planetary gear remain substantially constant, and flank angles of said central gears differing from each other by at least about twice the value of said entry angle, wherein a tangential correction is formed on the surface of said rotating element in order to accept the radial movement of the planetary gear teeth to changes in the effective tooth height of the planetary gear teeth.

18. A planetary gear drive comprising two adjacently disposed coaxial central gears with differing numbers of substantially wedge-shaped gear teeth which form virtual tooth gaps with one another and define a virtual crown curve, the radii of the root circles of the two central gears being of different size, said gear drive further comprising a planetary gear having teeth which are pressed by means of a rotating element into said virtual tooth gaps, the center of curvature of said virtual crown curve and the differing radii of the root circles of the two central gears being selected such that the virtual crown curve extends largely out of the row of gear teeth of said central gears after a 90° rotation, and a predetermined engagement region between the teeth of the planetary gear and the virtual tooth gaps formed by the teeth of the central gears lying in a region of minimum change of the entry and exit angles wherein a tangential correction is formed on the surface of said rotating element in order to adapt the radial movement of the planetary gear teeth to changes in the effective tooth height of the planetary gear teeth.

* * * * *